United States Patent [19]
Ong

[11] Patent Number: 5,490,179
[45] Date of Patent: Feb. 6, 1996

[54] SIGNAL GRADING IN A SELECTIVE CALL RECEIVER FOR AUTOMATIC GAIN CONTROL

[75] Inventor: Dee Nai Ong, Singapore, Singapore

[73] Assignee: Motorola, Inc., Schaumburg, Ill.

[21] Appl. No.: 301,087

[22] Filed: Sep. 6, 1994

[51] Int. Cl.$^6$ ................................................. H04L 27/08
[52] U.S. Cl. ................................................................. 375/345
[58] Field of Search ........................................ 375/344, 345; 340/825.44; 455/234.1, 234.2, 251.1, 295

[56] References Cited

U.S. PATENT DOCUMENTS

| | | | |
|---|---|---|---|
| 4,928,314 | 5/1990 | Grandfield et al. | 455/236 |
| 5,001,776 | 3/1991 | Clark | 455/226 |
| 5,359,607 | 10/1994 | Nguyen et al. | 371/5.5 |

Primary Examiner—Stephen Chin
Assistant Examiner—Huong Luu
Attorney, Agent, or Firm—D. Andrew Floam

[57] ABSTRACT

A selective call receiver (10) comprising a receiver circuit (100) having at least one radio frequency amplifier (112) and at least one mixer (114), a baud rate detector (102), a signal grader (104), and a gain controller (106). Coupling to the baud rate detector (102) to determine the signal quality of a selective call signal, the signal grader (104) collates the results of at least one baud rate detection with a plurality of predetermined criteria and assigns a signal grade to the selective call signal. The signal grader (104) then indicates the signal grade to the gain controller (106) which then sets the at least one radio frequency amplifier (112) and the at least one mixer (114) to operate with one of a plurality of selectable predetermined parameters including a gain setting and a mixer injection setting corresponding to the signal grade assigned to the selective call signal.

8 Claims, 3 Drawing Sheets

30

| SIGNAL GRADE | CRITERIA |
|---|---|
| A | Correct baud rate detected.<br>Duty cycle 50/50 (± 1/8 bit or no jittering).<br>No bad edges (for example no noise transitions or sparks). |
| B | Correct baud rate detected.<br>Duty cycle jittery (greater than 1/8 bit but less than 1/4 bit).<br>No bad edges (for example no noise transitions or sparks). |
| C | Correct baud rate detected.<br>Duty cycle jittery due to noise or weak signal due to bad edges.<br>Bad edges detected but passing limits of the baud rate detection. |
| BAD | Fails baud rate detection.<br>Weak signal at the correct baud rate<br>Bad edges detected failing limits of the baud rate detection. |

| SIGNAL GRADES | GAIN CONTROLLER'S ACTION | |
|---|---|---|
| | Two-Level Control | Multi-Level Control |
| Bad | Set to HIGH gain | Set to HIGHEST gain |
| Grade 'A' | Set to LOW gain | Set to LOWEST gain |
| Grade 'B' | Set to LOW gain | Set to LOW gain |
| Grade 'C' | Set to HIGH gain | Set to HIGH gain |

*FIG. 4*

SIGNAL GRADING IN A SELECTIVE CALL RECEIVER FOR AUTOMATIC GAIN CONTROL

FIELD OF THE INVENTION

This invention relates in general to selective call receivers and in particular to a method and apparatus for automatic gain control in a selective call receiver.

BACKGROUND OF THE INVENTION

In a conventional selective call communication system, selective call signals are received at a predetermined baud rate by at least one selective call receiver. Upon receiving a selective call signal, a selective call receiver typically performs a baud rate detection. Performing the baud rate detection allows verification of a selective call signal before the selective call receiver decodes a selective call message encoded within the selective call signal.

Under normal operating conditions, selective call signals are subjected to noise interferences and have duty cycle offsets. A typical baud rate detection ensures that a selective call signal meets certain signal quality criteria before it is processed. Otherwise, a selective call signal that is noisy or with bad duty cycle offsets can be processed incorrectly.

One typical criterion of a baud rate detection is a pass and fail grading of a selective call signal in terms of duty cycle offsets. However, a pass or fail criterion does not reliably grade a selective call signal that is at a signal threshold level with varying levels of duty cycle offsets. Depending on the operating conditions of a selective call receiver, varying levels of duty cycle offsets can be acceptable.

Baud rate detections also allow a selective call receiver to conserve current. For example, when a baud rate detection fails, the selective call receiver can inactivate its receiver circuit so as not to continue receiving a selective call signal. As the receiver circuit of a selective call receiver consumes a large portion of available current, inactivating the receiver circuit therefore saves current.

Thus, what is needed is a method to reliably grade a selective call signal in a selective call receiver, and thereby reduce its current consumption by adopting optimum operating conditions.

SUMMARY OF THE INVENTION

In carrying out the objects of the present invention in one form, there is provided a method and appartus for automatic gain control in a selective call receiver. The selective call receiver comprises a receiver circuit for receiving a selective call signal at one of a plurality of predetermined baud rates and having at least one radio frequency amplifier and at least one mixer. In addition, the selective call receiver also comprises a baud rate detector for performing at least one baud rate detection to detect the selective call signal and a signal grader that is coupled to the baud rate detector for collating the results of the at least one baud rate detection with a plurality of predetermined criteria to determine the signal quality of the selective call signal. From the collating, a signal grade is assigned to the selective call signal based on the signal quality. This signal grade is one of at least three signal grades. The selective call receiver further comprises a gain controller that is coupled to the signal grader and to the receiver circuit for setting the at least one radio frequency amplifier and the at least one mixer to operate with one of a plurality of selectable predetermined parameters corresponding to the signal grade assigned to the selective call signal.

BRIEF DESCRIPTION OF THE DRAWING

FIG. 3 is a table of a plurality of signal grades and a plurality of predetermined criteria corresponding to the plurality of signal grades in accordance with the preferred embodiment of the present invention.

FIG. 4 is a table of signal grades and their corresponding gain settings in accordance with two alternate embodiments of the present invention.

DETAILED DESCRIPTION OF THE INVENTION

Figure 1:
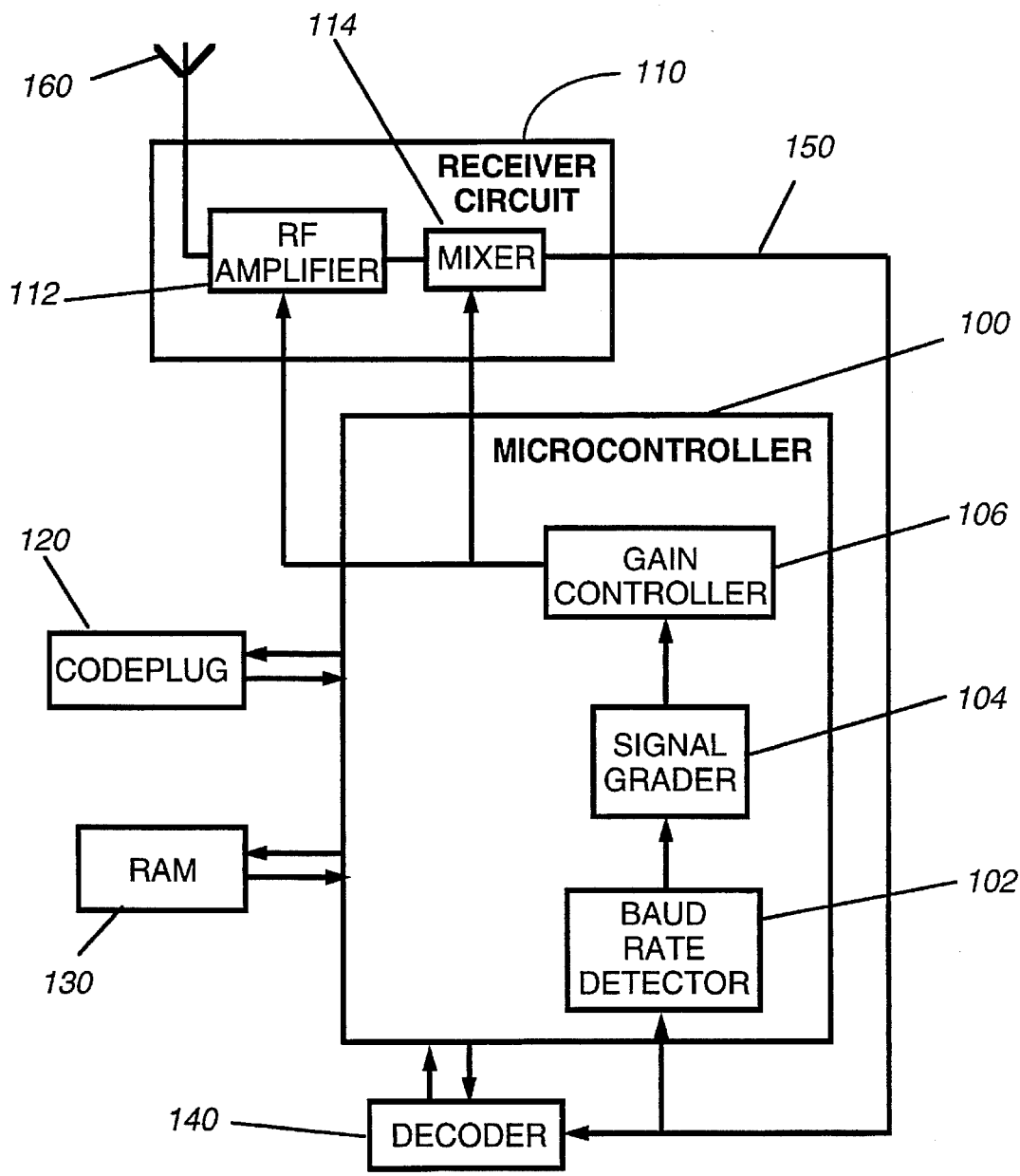
FIG. 1 is a block diagram of a selective call receiver in accordance with a preferred embodiment of the present invention.

In accordance with a preferred embodiment of the present invention, FIG. 1 shows a block diagram of a selective call receiver 10. The selective call receiver 10 comprises a microcontroller 100 that is coupled to a receiver circuit 110 for receiving and demodulating a selective call signal, a codeplug 120 for storing a plurality of selective call signal parameters that includes a plurality of predetermined baud rates, a random access memory 130 (RAM) for accessing data to process, and a decoder 140 for decoding a selective call message encoded within the selective call signal.

Received by an antenna that is coupled to the receiver circuit 110, the selective call signal conducts along a signal path 150 within the selective call receiver 10. In the receiver circuit 110 portion of the signal path 150, at least one radio frequency (rf) amplifier 112 amplifies the selective call signal before it mixes with an injection signal from at least one mixer 114. Further along the signal path 150 and within the microcontroller 100, a baud rate detector 102 performs at least one baud rate detection to detect the selective call signal. Detecting the selective call signal requires the baud rate detector 102 to determine one of a plurality of predetermined baud rates at which the selective call signal is received. The at least one baud rate detection enables the microcontroller 100 to determine whether a selective call signal is intended for the selective call receiver 10 before further processing. Examples of baud rate detection for a selective call signal are disclosed in U.S. Pat. Nos. 5,077,758 and 5,095,498.

Upon receiving the results of the at least one baud rate detection, a signal grader 104 collates these results with a plurality of predetermined criteria to determine the signal quality of the selective call signal. Based on the signal quality, a gain controller 106 determines a gain setting for the at least one rf amplifier 112 and an injection setting for the at least one mixer 114 to enable optimum operation of the receiver circuit 110. In accordance with the preferred embodiment of the present invention, the at least one rf amplifier 112 comprises a rf amplifier having a plurality of selectable gain settings, and the at least one mixer comprises a mixer having a plurality of selectable mixer injection settings.

One advantage of the present invention is that by determining the signal quality of the selective call signal using the results of the at least one baud rate detection, a reliable method and apparatus is provided to control the gain of the at least one rf amplifier 112. This is advantageous because a selective call signal with good signal quality does not require the at least one rf amplifier 112 to operate at a high gain that requires a larger amount of current than operating at a lower gain. Likewise, the at least one mixer 114 does not need a high mixer injection for a good quality selective call signal. As is known, any rf amplifier or mixer in the receiver circuit 110 consumes a large portion of current available to the selective call receiver 10 and reducing the current gain or mixer injection helps in prolonging the selective call receiver's 10 operating capability.

Figure 2:
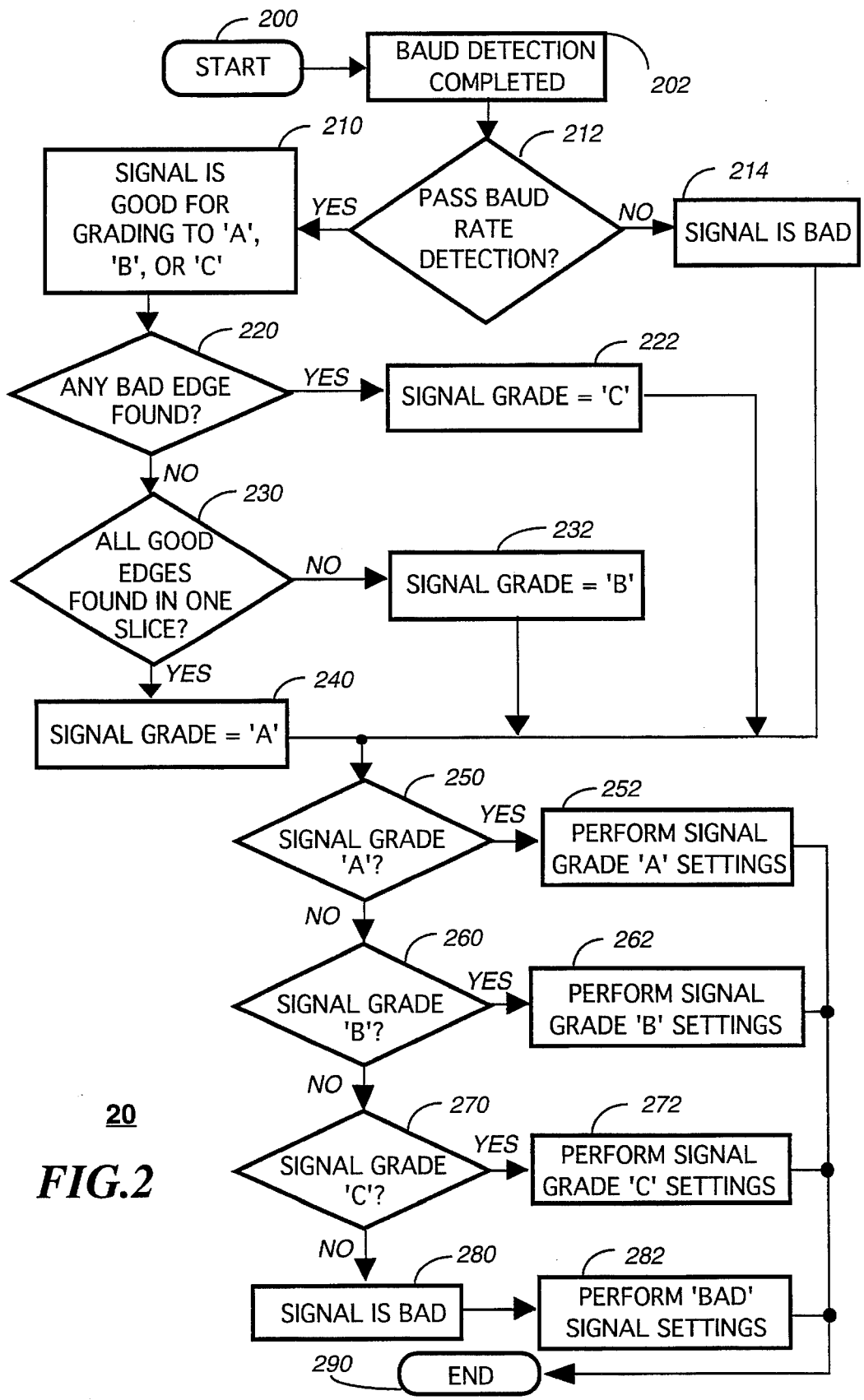
FIG. 2 is a flow chart of the operation of the signal grader and the gain controller shown in FIG. 1 in accordance with the preferred embodiment of the present invention.

In accordance with the preferred embodiment of the present invention, FIG. 2 shows a flow diagram 20 of the operation of the signal grader 104 and the gain controller 106 shown in FIG. 1. Beginning at step 200 and after the baud rate detector 102 completes the at least one baud rate detection 202, the signal grader 104 checks whether the selective call signal passes the at least one baud rate detection 212. In passing this check 212, the signal grader 104 then collates the results 210 of the at least one baud rate detection according to the plurality of predetermined criteria.

The plurality of predetermined criteria, disclosed in accordance with the preferred embodiment of the present invention, includes the one of a plurality of predetermined baud rates at which the selective call signal is received, the duty cycle of the selective call signal, and the number of data bit edges detected within one of a plurality of predetermined periodic time intervals in the at least one baud rate detection. The data bit edges correspond to data bit edge transitions from one bit value to an opposite bit value, for example a bit '1' to a bit '0' or a bit '0' to a bit '1'.

Using the plurality of predetermined criteria, different grades can be assigned to the selective call signal depending on its signal quality. For the preferred embodiment in accordance with the present invention, a grading scale with, for example, three different grades are available to grade the signal quality of the selective call signal based on the plurality of predetermined criteria. FIG. 3 illustrates one possible grading scale for the selective call signal in accordance with the preferred embodiment of the present invention.

After the selective call signal is assigned a signal grade 222,232,240, based on the results of steps 220,230, the signal grader 104 then provides a signal input to the gain controller 106 indicating the signal grade. With the signal input, the gain controller 106 sets the at least one rf amplifier 112 and the at least one mixer 114 to operate with one of a plurality of selectable predetermined parameters corresponding to the signal grade assigned to the selective call signal. For the at least one rf amplifier 112, the plurality of selectable predetermined parameters comprises at least three selectable values of amplifier gains, and for the at least one mixer 114, the plurality of selectable predetermined parameters comprises at least three selectable values of mixer injections. For example, when the selective call signal is graded with an 'A', the gain controller 106 performs signal grade 'A' settings as indicated in step 252. Likewise, the gain controller 106 sets the gain of the at least one rf amplifier 112 and the mixer injection of the at least one mixer 114 according to the signal grade of the selective call signal in steps 262, 272, 282.

In accordance with a first alternate embodiment 420 of the present invention, FIG. 4 shows a table of settings performed by the gain controller 106 on the at least one rf amplifier 112 and the at least one mixer having two selectable values of amplifier gains and mixer injections respectively. FIG. 4 also shows a second alternate embodiment 440 of the present invention wherein the at least one rf amplifier 112 has more than three selectable values of amplifier gains, and the at least one mixer 114 has more than three selectable values of mixer injections. In this second alternate embodiment 440, the gain controller 106 performs a multi-level control setting for the at least one rf amplifier 112 and the at least one mixer 114. Both alternate embodiments 420,440 is applicable for a selective call signal graded with one of the at least three signal grades in accordance with the preferred embodiment of the present invention.

Although the preferred embodiments and the alternate embodiments 420,440 operate with three signal grades, any signal grading scheme encompassing more than three signal grades can be embodied in accordance with the present invention. Thus, a signal grading scheme with more than three signal grades needs to redefine the plurality of predetermined criteria for determining a signal grade.

By providing at least three signal grades to account for variations in the signal quality of the selective call signal, an improvement is made over a pass or fail criterion that does not reliably grade a selective call signal. This is advantageous because a selective call signal typically have varying levels of signal quality that does not necessarily require the at least one rf amplifier 112 or the at least one mixer 114 to operate at a maximum gain or mixer injection respectively. Furthermore, varying levels of duty cycle offsets can be accommodated within the plurality of predetermined criteria and, therefore, should not necessarily fail in terms of signal quality.

Another advantage of the present invention is that it uses the results of the at least one baud rate detection which confirms the selective call signal before subsequent processing. Hence, the present invention operates only for a desired selective call signal intended for the selective call receiver 10. This, therefore, does not waste current when checking and applying an automatic gain control for an undesired selective call signal that is not intended for the selective call receiver 10.

By now it should be appreciated that there has been provided a novel method and apparatus to reliably grade a selective call signal in a selective call receiver 10, and thereby reduce its current consumption by adopting optimum operating conditions.

We claim:

1. A method for automatic gain control in a selective call receiver having a receiver circuit for receiving and demodulating a selective call signal, and a microcontroller for controlling the receiver circuit, and wherein the microcontroller includes a baud rate detector for performing at least one baud rate detection to detect said selective call signal received at one of a plurality of predetermined baud rates, and further wherein the receiver circuit includes at least one radio frequency amplifier coupled to at least one mixer, and wherein the at least one mixer is coupled to the baud rate detector, the method comprising the steps of:

collating results of the at least one baud rate detection with a plurality of predetermined criteria to determine a signal quality of said selective call signal, wherein the plurality of predetermined criteria includes a number of bit edges detected by the baud rate detector within one of a plurality of predetermined periodic time intervals in the at least one baud rate detection;

assigning a signal grade to said selective call signal based on the step of collating, wherein the signal grade is one of at least three signal grades;

providing the signal grade to a gain controller, coupled to the at least one radio frequency amplifier and the at least one mixer within the receiver circuit; and setting the at least one radio frequency amplifier and the at least one mixer to operate with one of a plurality of selectable predetermined parameters corresponding to the signal grade assigned to said selective call signal in response to the steps of collating and assigning.

2. The method of claim 1 wherein the step of collating comprises the step of detecting the bit edges corresponding to data bit edge transitions from one bit value to an opposite bit value.

3. The method of claim 1 wherein the step of setting the one of the plurality of selectable predetermined parameters comprises the step of selecting the one of the plurality of selectable predetermined parameters from at least three selectable values of amplifier gains for the at least one radio frequency amplifier and at least three selectable values of mixer injections for the at least one mixer.

4. A selective call receiver comprising:

a receiver circuit for receiving a selective call signal at one of a plurality of predetermined baud rates and having at least one radio frequency amplifier and at least one mixer, wherein the at least one radio frequency amplifier is coupled to the at least one mixer;

a baud rate detector for performing at least one baud rate detection to detect said selective call signal, wherein output of the at least one mixer is coupled to the baud rate detector;

a signal grader coupled to the baud rate detector for collating results of the at least one baud rate detection with a plurality of predetermined criteria including a number of bit edges detected by the baud rate detector within one of a plurality of predetermined periodic time intervals in the at least one baud rate detection to determine a signal quality of said selective call signal, and wherein a signal grade is assigned to said selective call signal based on the signal quality, and further wherein the signal grade is one of at least three signal grades; and a gain controller, coupled to the signal grader, the at least one radio frequency amplifier and the at least one mixer for setting the at least one radio frequency amplifier and the at least one mixer to operate with one of a plurality of selectable predetermined parameters corresponding to the signal grade assigned to said selective call signal.

5. The method of claim 4 wherein the bit edges correspond to data bit edge transitions from one value to an opposite value.

6. The method of claim 4 wherein the plurality of selectable predetermined parameters comprises at least three selectable values of amplifier gains for the at least one radio frequency amplifier and at least three selectable values of mixer injections for the at least one mixer.

7. A selective call receiver comprising:

a receiver circuit for receiving a selective call signal at one of a plurality of predetermined baud rates and having at least one radio frequency amplifier and at least one mixer, wherein the at least one radio frequency amplifier is coupled to the at least one mixer;

a codeplug for storing a plurality of selective call signal parameters including the one of a plurality of predetermined baud rates;

a decoder for decoding a selective call message encoded within said selective call signal; and a microcontroller coupled to the receiver circuit, the codeplug, and the decoder, and wherein the microcontroller comprises:

a baud rate detector for performing at least one baud rate detection to detect said selective call signal, wherein output of the at least one mixer couples to the baud rate detector;

a signal grader coupled to the baud rate detector for collating results of the at least one baud rate detection with a plurality of predetermined criteria including a number of bit edges detected by the baud rate detector within one of a plurality of predetermined periodic time intervals in the at least one baud rate detection to determine a signal quality of said selective call signal, wherein the bit edges correspond to data bit edge transitions from one value to an opposite value and further wherein a signal grade is assigned to said selective call signal based on the signal quality, and further wherein the signal grade is one of at least three signal grades; and a gain controller, coupled to the signal grader, the at least one radio frequency amplifier, and the at least one mixer receiver circuit for setting the at least one radio frequency amplifier and the at least one mixer to operate with one of a plurality of selectable predetermined parameters corresponding to the signal grade assigned to said selective call signal.

8. The selective call receiver of claim 7 wherein the plurality of selectable predetermined parameters comprises at least three selectable values of amplifier gains for the at least one radio frequency amplifier and at least three selectable values of mixer injections for the at least one mixer.

* * * * *